United States Patent [19]

Langdon

[11] Patent Number: 4,772,786
[45] Date of Patent: Sep. 20, 1988

[54] PHOTOTHERMAL OSCILLATOR FORCE SENSOR

[75] Inventor: Roger M. Langdon, Colchester, United Kingdom

[73] Assignee: The General Electric Company, p.l.c., London, England

[21] Appl. No.: 940,319

[22] Filed: Dec. 10, 1986

[30] Foreign Application Priority Data

Dec. 13, 1985 [GB] United Kingdom ................. 8530809

[51] Int. Cl.⁴ .............................................. G01D 5/34
[52] U.S. Cl. ............................ 250/231 R; 250/231 P;
250/227; 73/800; 73/862.59; 356/352
[58] Field of Search ...................... 73/705, 800, 862.41,
73/862.59; 250/231 R, 231 P, 227; 356/32,
35.5, 352, 732 T

[56] References Cited

U.S. PATENT DOCUMENTS

| 4,322,967 | 4/1982 | Seitel et al. ..................... 356/432 T |
| 4,379,226 | 4/1983 | Sichling et al. . |
| 4,470,313 | 9/1984 | Kalinoski et al. ................ 73/862.59 |
| 4,678,904 | 7/1987 | Saask et al. ..................... 250/231 P |
| 4,678,909 | 7/1987 | Jackson et al. ..................... 356/358 |
| 4,713,540 | 12/1987 | Gilby et al. ..................... 250/231 R |

FOREIGN PATENT DOCUMENTS

| 090167A2 | 2/1983 | European Pat. Off. . |
| 2144547A | 3/1985 | United Kingdom . |
| 2146120A | 4/1985 | United Kingdom . |

OTHER PUBLICATIONS 1600883, 02-1978, General Resistance, Inc.

*Primary Examiner*—Edward P. Westin
*Assistant Examiner*—Khaled Shami

[57] ABSTRACT

A sensor comprises a beam, e.g. of silicon, which resonates at a frequency dependent on the force imposed on the beam. Light on a line induces resonance of the beam by means of the photothermal effect. The light reflected from the beam is amplitude modulated at the resonance frequency, and returns along the line. It is reflected by a semi-reflecting plane mirror onto a lens which focusses it onto a photodetector. The photodetector produces an output voltage modulated at the oscillation frequency, and is thus representative of the force imposed on beam 1.

16 Claims, 5 Drawing Sheets

PHOTOTHERMAL OSCILLATOR FORCE SENSOR

BACKGROUND OF THE INVENTION

This invention relates to a sensor, and in particular to a force sensor. Force sensors are more important than other types of sensor, as they may be readily adapted to measure other physical properties.

In a known force sensor described in British Patent Application No. GB 2146120A, a light source produces light pulses which are used to induce resonance in a body by means of the photo-acoustic effect in which each of the incident light pulses causes alternate heating and cooling of the body at the frequency of the pulsed light source. The resonance frequency at which the body vibrates depends on a force applied to it. An advantage of this kind of force sensor is that no electrical connection between the vibrating body and the power source is required. The absence of electricity in sensors employing optically driven vibrating bodies is particularly advantageous when the sensors are used in environments where the presence of electricity is hazardous.

A disadvantage of this known type of force sensor is that it is very difficult to lock the optical pulse frequency on to the vibrational resonance frequency when that frequency is continually varying due to changes in the applied force. A separate technique is necessary to monitor the amplitude of vibration of the body or the phase of its vibrational displacement relative to the optical pulses, to provide feedback between the optical pulse frequency and the vibrational resonance frequency. The optical pulse frequency can then be automatically adjusted to follow any change in the resonance frequency, and hence keep the two locked together.

SUMMARY OF THE INVENTION

The present invention seeks to provide an improved sensor in which this difficulty is reduced.

According to a first aspect of this invention a sensor includes: a body having a resonance frequency which is dependent on the nature of the applied force; a light source arranged to continuously illuminate the said body; a modulating means which causes the amount of light absorbing by the body to be dependent on its vibrational displacement causing it to oscillate at a resonance frequency; and means for determining the resulting resonance frequency.

According to a second aspect of this invention a sensor includes: a body having a resonance frequency which is dependent upon the nature of an applied force; a light source arranged to continuously illuminate the body to cause it to vibrate at a resonance frequency due to a photothermal effect in which a portion of the body alternately expands and contracts resulting from a variation in the intensity of light illuminating the said body as the body expands and contracts; and means for determining the resulting resonance frequency.

The term 'light' when used in this specification is to be interpreted as including the range of electromagnetic radiation from infra-red to ultra-violet inclusive. Thus the body goes into self-oscillation when the light falls upon the body.

In one embodiment of the invention, a Fabry-Perot interferometer, whose light transmissive properties depend on the distance between two partially reflective surfaces, is interposed between the light source and the body such that the distance varies as the body expands and contracts, thereby causing the intensity of light illuminating the body to vary as the body expands and contracts.

In another embodiment of the invention the surface of the body which is illuminated by the light source is selectively masked such that part of it is reflective, and part of it is absorptive, and as the body expands and contracts, the proportion of the absorptive part exposed to illumination varies, thus varying the intensity of light illuminating the body.

BRIEF DESCRIPTION OF THE DRAWINGS

The invention is further described by way of example, with reference to the accompanying drawings, in which.

DESCRIPTION OF THE PREFERRED EMBODIMENTS

Figure 1:
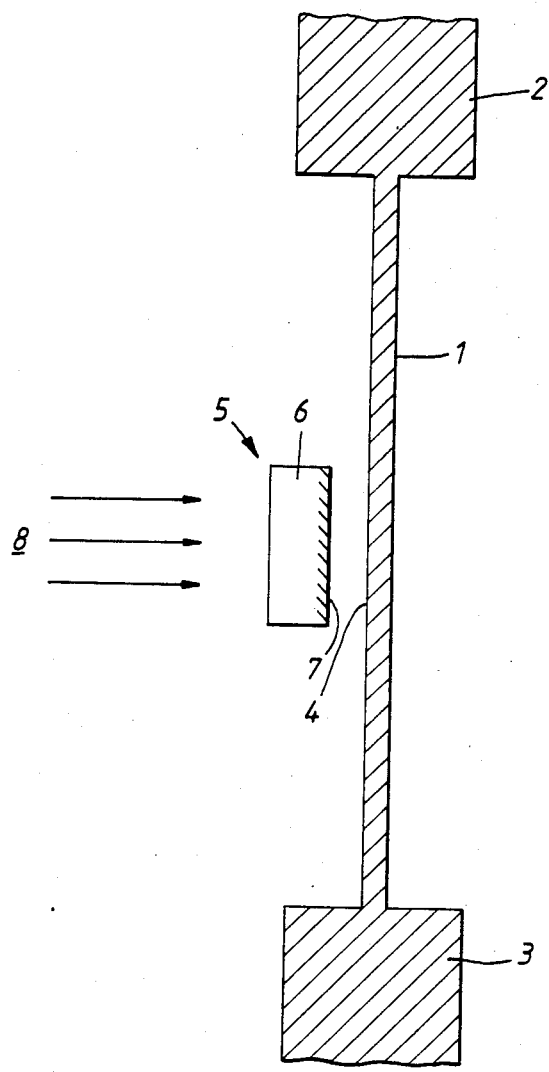
FIG. 1 illustrates schematically a vibratable beam which may be used in a sensor according to this invention.

Referring to FIG. 1, a rectangular beam 1 made from a rigid material such as aluminium or glass or a crystalline material such as quartz is supported on two comparatively massive supports 2 and 3 such that it can vibrate freely in a flexural mode in the plane of the paper. One surface 4 of the beam 1 is optically polished to produce a surface which is partially optically reflective and partially absorbing. A mirror 5 is placed in close proximity to the surface 4 comprises an optically polished flat glass plate 6 with a surface 7 having a partially transparent reflective coating or the side closest to the beam 1. The mirror is positioned so that its reflective surface is accurately parallel to the surface 4 and separated from it by a few wavelengths of the light with which it is intended to be used. The combination of the two surfaces 4 and 7 constitutes an optical interferometer of the Fabry-Perot type.

A Fabry-Perot interferometer is a device in which monochromatic light passing through a pair of plane-parallel, partially reflective surfaces, is strongly transmitted when the distance between the surfaces is exactly equal, or close, to an integral multiple of an optical half wavelength, and is strongly reflected when the distance between the reflective surfaces is substantially different from an integral multiple of an optical half wavelength.

Figure 2:
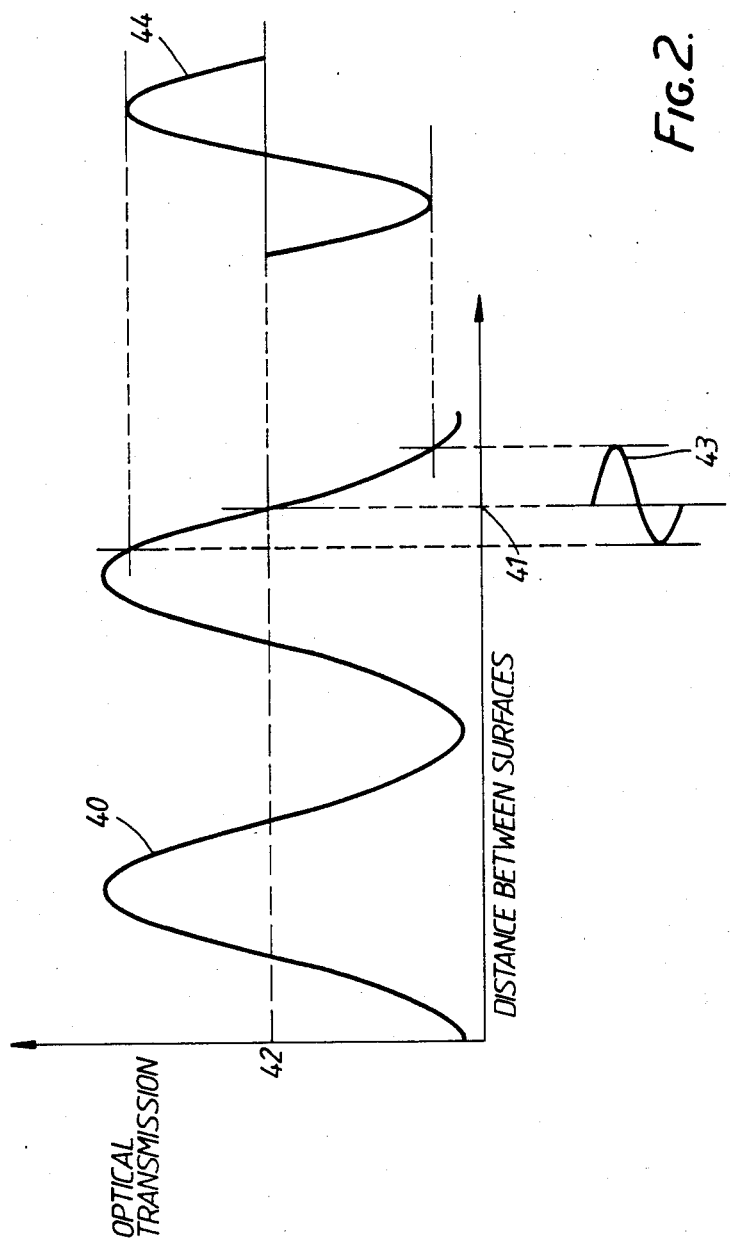
FIG. 2 shows in graphical form the relation between optical transmission of the Fabry-Perot interferometer and the mirror separation.

Referring to FIG. 2, curve 40 shows graphically how the optical transmission of the Fabry-Perot interferometer varies periodically as a function of the distance between the reflective surfaces. When the beam 1 (FIG. 1) is stationary, the distance between the surfaces is represented by point 41, and results in an optical transmission represented by point 42. When the beam 1 (FIG. 1) is caused to vibrate, the distance between the surfaces will vary sinusoidally with time, as indicated by curve 43, the optical transmission will vary substantially sinusoidially as indicated by curve 44. This variation indicated by curve 44 is in phase with the periodic variation of optical transmission represented by curve 40.

Referring again to FIG. 1, when mirror surface 7 is illuminated by a monochromatic beam of light 8, in a direction perpendicular to the mirror surface 7, the interferometer formed by surfaces 4 and 7 transmits the light if the mirror separation is initially close to an integral multiple of an optical half wavelength. Mirror surface 4 is composed of a partially reflective material such as a vacuum evaporated aluminium layer sufficiently thick to ensure that any light not reflected from the surface 4 is totally absorbed within the layer. The intensity of light beam 8 is sufficiently great to cause appreciable heating within the aluminium layer, which is immediately transferred by thermal conduction to the surface of the beam 1. The resulting thermal expansion of the surface layer of beam 1 causes the beam 1 to bend outwards in a direction which reduces the gap between mirror surfaces 4 and 7. The change in the separation distance of the mirror surfaces 4 and 7 causes a reduction in the amount of transmitted light because the separation has changed. This results in the heating of aluminium layer 4 and therefore of the surface of beam 1 being substantially reduced so that the surface of the beam cools and the corresponding thermal contraction causes the beam to return towards its original position. Having returned, the heating of the surface by the transmitted light increases again and the cycle repeats itself. The thermal capacity and thermal conductivity of beam 1 are such that the time required for the beam temperature to reach equilibrium when it is heated and cooled is much larger than the periods of the vibrational cycle, so that the surface temperature of beam 1 is approximately proportional to the time-integral of the optical power transmitted through the interferometer. When the beam is vibrating sinusoidally in a flexural mode, the transmitted power is modulated sinusoidally in phase with the beam displacement. The resulting modulation of the surface temperature of beam 1 also varies sinusoidally but it lags in phase behind the beam displacement by approximately 90 degrees because it is proportional to the time-integral of the transmitted power.

The mechanical bending force driving the vibration is proportional to the sinusoidal component of the temperature rise in the surface, and therefore this force is 90 degrees out of phase with the beam displacement. It is well known that when a mechanically resonant structure is driven by a sinusoidally modulated force, the force and displacement are 90 degrees out of phase when the driving frequency is equal to the mechanical resonance frequency, so in this case the relative phase of driving force and displacement are correct for maintaining oscillation at the resonance frequency. Provided that the mechanical energy gained by the beam during the heating part of the vibrational cycle is greater than the energy lost during the vibrational cycle as a whole due to internal mechanical friction in beam 1 and acoustic radiation to its surroundings, the amplitude of vibration will increase on successive cycles causing beam 1 to oscillate in a self-sustaining manner. The amplitude of vibration will continue to increase until the non-linear displacement versus transmission characteristic of the interferometer shown in FIG. 2 causes the sinusoidal component of drive power to be limited. The vibration amplitude will then stabilise at a value for which the power gained from the light source and the power lost from the beam vibration are in equilibrium.

For oscillation to be self-starting and self-sustaining, two conditions need to be met:

(a) the separation of mirror surfaces 4 and 7 should initially be such that absorption of heat by beam 1 causes it to move in a direction which causes a reduction in optical power transmitted by the interferometer, and (b) the light power illuminating beam 1 should be sufficient to ensure that the mechanical energy gained by the beam during each cycle from the illumination is greater than the energy lost per cycle. The minimum energy required to achieve this is referred to as the threshold power for the oscillation.

The light reflected from the interferometer mirror surfaces when the beam 1 is self-oscillating is amplitude modulated at the vibration frequency. The beam vibration frequency may therefore be conveniently measured by directing the reflected light onto a photodetector (not shown in FIG. 1) and measuring the frequency of the resulting electrical signal. The device may be used as a force sensor by applying a force to beam 1 along its axis through the mountings 2 and 3 and measuring the resulting change in oscillation frequency measured by the photodetector.

In order that the threshold power is comparable with the power available from commonly used light sources such as light-emitting semi-conductor diodes and laser diodes, the dimensions of the beam 1 must be small. Typically, the beam 1 is approximately 3 mm long, 0.05 mm wide and 0.02 mm thick. A beam of these dimensions will have a resonance frequency of about 20 kHz.

Small structures of this type can readily be fabricated by micro-mechanical techniques.

Figure 3:
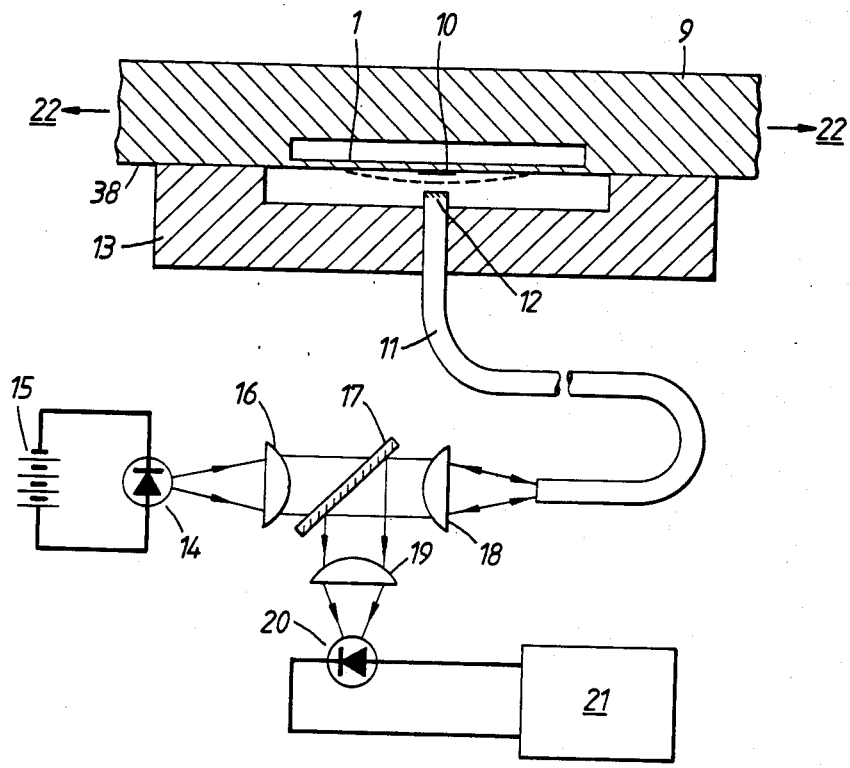
FIG. 3 illustrates a photothermal oscillator sensor in which a Fabry-Perot interferometer is used to vary the intensity of the incident light.

FIG. 3 shows a photothermal oscillator sensor employing a vibratable beam fabricated by micro-mechanical techniques. A vibratable beam 1 of approximately rectangular cross-section is fabricated by chemical etching from a plate of silicon 9 which may be 0.5 mm thick overall. The beam, which has dimensions comparable with those mentioned above, is attached to the body of the plate at each end but is otherwise free to vibrate in a direction perpendicular to the plate surface 38. A middle portion 10 of the of beam 1 which is coplanar with the surface of plate 9, is optically polished, although alternatively an optically flat metallic film such as a thin aluminium layer may be deposited on the middle portion 10 of the beam 1 to enhance its reflectivity. An optical fibre 11 is positioned close to the surface of beam 1 near to is middle portion 10. The fibre 11 has an optically polished end 12 which is flat and perpendicular to the fibre axis and is coated with a partially reflective metal coating such as a thin aluminium layer or a partially reflective multi-layer dielectric coating. The end of the fibre is positioned so that it is parallel to the surface of the beam 1, and opposite the middle portion of the beam surface 4, and is separated from it by a few optical wavelengths to constitute the Fabry-Perot interferometer. This can be achieved by mounting the end of the fibre in an accurately machined hole in a separate silicon block 13 which is bonded onto the surface of silicon plate 9. Silicon block 13 has a recess machined or etched into the bonded surface to ensure that the vibrating beam 1 does not touch the surface of block 13 during the course of its oscillation. It is advantageous to make block 13 from the same material as plate 9 and beam 1 and with the same crystallographic orientation so that differential thermal expansion between the components does not occur when the temperature changes, causing deformation of the structure. The exact separation between the end of reflective fibre 12 and the reflective surface of the beam 1, is adjusted to be close to an integral number of a half wavelength of the light illuminating the optical fibre. This allows light energy passing from the fibre into the interferometer space between the reflective surfaces of the middle portion 10 and the end 12 to be greatly absorbed by the surface of beam 1.

Optical fibre 11 may be of a multi-mode type, that is to say having a sufficiently large core diameter (such as 50 micrometers) to allow light to propagate along it in a zig-zag fashion with a direction of propagation at an angle to the fibre axis, but is preferably of a single-mode type with a core diameter of typically 3-6 micrometers which allows light to propagate in a direction parallel to the axis only and suppresses zig-zag modes. The use of single-mode fibre ensures that light emerging from the fibre end propagates in a direction perpendicular to the reflective surfaces of the middle portion 10 and the end 12 and so is reflected from the surfaces in a perpendicular direction. The avoidance of off-axis modes which may be introduced by the use of multi-mode fibre, ensures that the intensity modulation of light absorbed in the reflective surface of middle portion 10 is a maximum.

Light is generated by a continuous light source 14 which is preferably a light-emitting semiconductor diode or a laser diode emitting over a narrow range of wavelengths so as to constitute a substatially monochromatic source of light. The light source is powered by a continuous current source 15. Light from source 14 is focussed into an approximately parallel beam by lens 16. The approximately parallel beam then passes through a semi-reflecting plane mirror 17 and is refocussed by lens 18 onto the end of optical fibre 11. The light power emitting into fibre 11 is greater than the threshold power for oscillation defined previously, which may be of the order of 1 milliwatt for a structure of the dimensions defined above. The beam 1 then oscillates spontaneously in its fundamental flexural mode provided that the light power is not sufficiently great to exceed the oscillation threshold for higher order flexural modes.

Provided that beam 1 is illuminated symmetrically about its mid-point, only symmetrical flexural modes will be excited. It can be shown theoretically that the threshold power for exciting the next highest symmetrical flexural mode above the fundamental is approximately 30 times greater than that needed to excite the fundamental mode itself. In practice, therefore, the photothermal oscillator can be easily constrained to oscillate in the fundamental mode only, by adjustment of the input power.

When beam 1 is oscillating, the reflected light returned to the optical fibre 11 by the interferometer will be modulated in intensity at the oscillation frequency. The return light passing through the fibre is reflected by semi-reflecting plane mirror 17 onto lens 19 which focusses it onto photodetector 20 which may be a silicon photovoltaic cell. Photodetector 20 produces an output voltage modulated at the oscillation frequency which is measured by a frequency counter 21.

The photothermal oscillator as described may operate as a force sensor by applying stress to plate 9 in a direction parallel to the axis of beam 1 as shown by arrows 22. The resulting stress in beam 1 causes a change in its flexural resonance frequency and hence a change in oscillation frequency. Measurement of the oscillation frequency by frequency counter 21 provides a measure of the force applied to plate 9. Alternatively, the force may be applied to plate 9 by bending it into an arc of a circle causing stress in beam 1 and hence a change in its resonance frequency.

The described embodiment may be adapted to be a pressure sensor by using a pressure sensitive diaphragm in place of plate 9. A capsule covering one surface of the diaphragm allows a differential pressure to be exerted across it when gas is admitted to the capsule under pressure. As the differential pressure across the diaphragm changes, the stress in beam 1 changes and hence the beam oscillation frequency changes. The oscillation frequency may be measured by the method already described, and its value provides a measure of the applied pressure.

The force sensor may also be readily adapted to be a temperature sensor. In addition to the structure described previously and illustrated in FIG. 3, a plate of metal or other suitable material is attached to the back of silicon plate 9. The additional plate, being made of a material such as aluminium, has a significantly different coefficient of thermal expansion to the silicon plate. The resulting difference in thermal expansion causes stress to be set up in plate 9, having a magnitude dependent upon the temperature. The stress in beam 1 and hence its oscillation frequency will therefore be temperature dependent, a measurement of the oscillation frequency providing an indication of temperature.

The embodiment of the invention as described, is a self-oscillating optical device in which a vibratable body is driven by a light source using the photo-thermal effect. The intensity of incoming light is modulated by the displacement of the body by means of a Fabry-Perot interferometer, to provide positive feedback between the driving force and the motion of the beam.

In an alternative embodiment of the invention, the intensity of incoming light is modulated by the displacement of the body by means of a selective masking technique which provides a positive feedback between the driving force and the motion of the beam.

Figure 4:
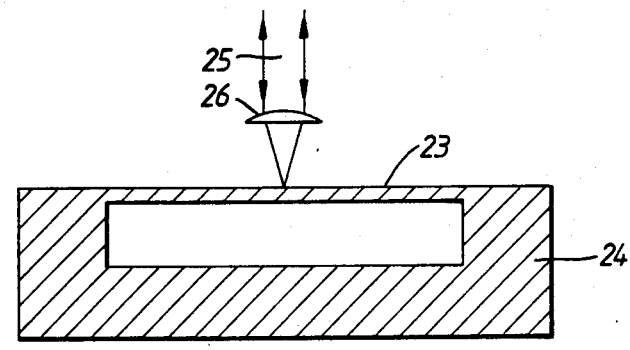
FIG. 4 illustrates schematically an alternative embodiment of a photothermal oscillator sensor in which selective masking is used to vary the intensity of the incident light.

Referring to FIG. 4, a thin rectangular beam 23 is made from a rigid material such as a metal, or a crystalline material such as silicon or quartz and is attached at each end to a comparatively massive mounting assembly 24 in such a way that it can freely vibrate in a flexural mode in a plane roughly perpendicular to the plane of the paper. A beam of light 25, preferably from a continuous unmodulated laser source, is focussed by lens 26 into a small spot which is incident on the outer surface of beam 23 at a point roughly midway between the mountings at each end.

Figure 5:
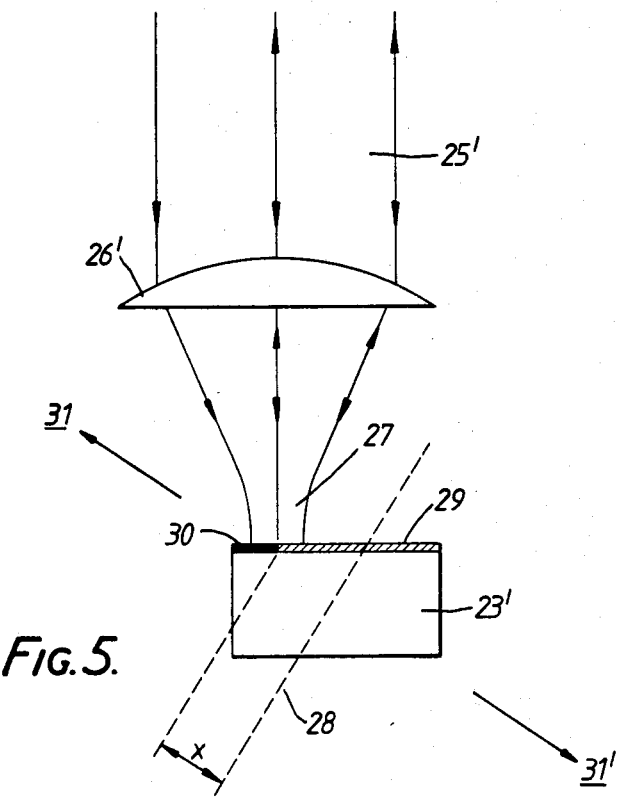
FIG. 5 illustrates in more detail the principle of selective masking feedback technique used in the embodiment illustrated in FIG. 4.

The position of the focussed spot is explained in more detail with reference to FIG. 5, which shows a cross-sectional view of beam 23. denoted by 23' with the light beam 25' focussed by lens 26' into a focussed spot 27. The centre of the light spot 27 is displaced by a certain distance x from the neutral axis 28 of vibrating beam 23 so that the thermal expansion of the beam resulting from absorption of power from the light spot produces a bending moment about the neutral axis 28. An optically reflecting metal layer 29 is attached to the surface of beam 23' in such a position that it intercepts approximately half the area of the focussed spot 27 on the side closest to the neutral axis 28. The remainder of the beam surface illuminated by spot 27 is covered by a layer of an optically absorbing material 30 which absorbs the greater part of the light incident upon it.

When the light beam is initially switched on and the beam 23' is at rest, the absorption of light by material 30 causes heating of this layer which is rapidly transferred by thermal conduction to the beam material underneath. The localised thermal expansion of the beam caused by the heating produces a bending moment in beam 23' which tends to move it approximately in the direction shown by arrow 31. As a result of this movement, a smaller area of absorbing material 30 is exposed to light spot 27 and the heating becomes less. As the heating is reduced, beam 23' cools and moves back to its original position where the cycle begins again. During each cycle, beam 23' gains a small amount of vibrational energy from the heat supplied by the light beam and loses a small amount of energy as a result of various forms of vibrational damping such as internal frictional losses in the beam material and acoustic radiation to its surroundings. If the energy gain per cycle is greater than the energy loss, the vibrational amplitude increases after each cycle and builds up to a steady maximum amplitude where the oscillation becomes self-sustaining.

Figure 6:
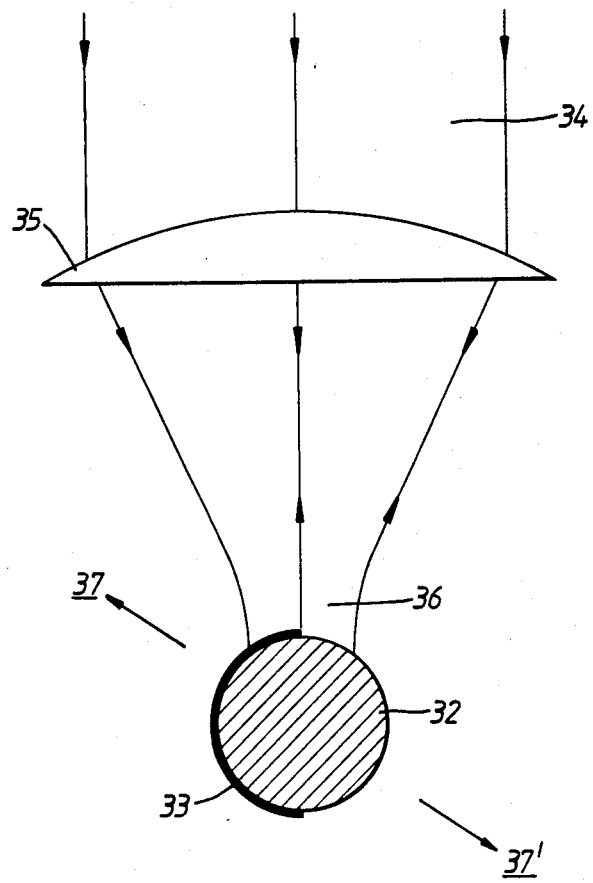
FIG. 6 illustrates another embodiment of the invention, also using the selective masking technique.

In an alternative embodiment, instead of using a rectangular vibratable beam as described previously, a photo-thermal oscillator may also be constructed using a vibratable wire as shown in FIG. 6. A round wire 32 shown here in cross-section, is suspended between two comparatively massive and rigid supports (not shown) in such a way that it can vibrate freely in a flexural mode. The wire is made from a metal such as aluminium which has a highly reflecting surface, or is made from a non-reflecting material such as a glass fibre with a highly reflecting coating such as aluminium, deposited upon it. A semi-cylindrical section of the wire is coated with a thin opaque absorbing layer 33, such as black matt paint, over a short length, midway between the supports. A laser beam 34 is focussed by a lens 35 into a focussed spot 36 which is incident on the wire surface at the midpoint between the supports. The focussed spot 36, which should ideally be somewhat smaller than the wire diameter, is positioned such that half the spot covers the opaque layer 33 and half the reflective surface of the wire. The device operates as a photothermal oscillator in substantially the same way as the rectangular beam device described with reference to FIGS. 1 and 3. The angle which the plane of vibration, defined by the arrows 37 and 37', makes with the direction of the light beam is some angle intermediate between 0 and 90° which causes the bending moment about the neutral axis of the wire and the thermal modulation per unit vibrational displacement of the wire to be simultaneously maximised. In practice, the angle is in the region of 45° to the light beam axis.

An approximate calculation has been done to find the minimum power needed to cause self-oscillation. For an aluminium wire 25 micrometers in diameter and 6 mm long vibrating in the fundamental flexural mode at a frequency of approximately 3 kHz with a Q-factor of 1000 (the Q-factor is used to indicate the amount of energy locked in the vibrating structure relative to the amount of energy that must be fed in to maintain the vibrations), and illuminated by a focussed spot 5 micrometers in diameter, the minimum power needed for self-oscillation is approximately 25 microwatts. This is well within the power available from continuous semiconductor lasers using a single mode or multi-mode optical fibre to conduct the light from the laser to the photo-thermal oscillator.

For both types of oscillator described above, a proportion of the input light is reflected back from the vibrating surface in a direction parallel to the incoming light and will therefore be returned along an optical fibre connection between the laser source and the oscillator. The return light is modulated at the beam vibration frequency and may therefore be used to measure this frequency.

I claim:

1. A sensor including:
   a body having a vibratory resonance frequency which is dependent on the nature of an applied force;
   a light source means for providing a continuous illumination;
   a Fabry-Perot interferometer having means for transmitting the illumination to said body so as to illuminate said body such that some of the transmitted illumination is absorbed by the body, said interferometer having two partially reflective surfaces and light transmissive properties which are dependent on a distance between said two surfaces, one of said two surfaces moving with said body such that said distance varies as said body vibrates, the transmitted illumination absorbed by said body causing said body to oscillate at the resonance frequency; and
   means for determining the resonance fequency.

2. A sensor including:
   a body having a vibratory resonance frequency which is dependent upon the nature of an applied force;
   a light source means for providing a continuous illumination;
   a Fabry-Perot interferometer having means for transmitting the illumination to said body so as to illuminate said body such that some of the transmitted illumination is absorbed by the body, said interferometer having two partially reflective surfaces and light transmissive properties which are dependent on a distance between said two surfaces, one of said two surfaces moving with said body such that said distance varies as the body vibrates, the transmitted illumination causing said body to vibrate at the resonance frequency due to a photothermal effect in which a portion of said body alternately expands and contracts resulting from a variation in the intensity of the transmitted illumination; and
   means for determining the resonance fequency.

3. A sensor including:
   a body having a vibratory resonance frequency which is dependent on the nature of an applied force;
   a light source means for providing a continuous illumination to said body;
   a mask interposed between said light source means and said body to transmit to said body only a fraction of the intensity of the illumination, the fraction being dependent on the position of said body, the transmitted illumination causing said body to vibrate at the resonance frequency due to a photothermal effect in which a portion of said body alternately expands and contracts resulting from corresponding variations in the fraction; and means for determining the resonance frequency.

4. A sensor as claimed in claim 1 and wherein said one of said two surfaces is carried by a region of said body which absorbs the illumination.

5. A sensor as claimed in claim 4 and wherein said one of said two surfaces is constituted by an optically flat surface region of said body itself.

6. A sensor as claimed in claim 4 and wherein said one of said two surfaces is constituted by the outer surface of a thin metallic layer deposited upon said body.

7. A sensor as claimed in claim 1, and wherein the other of said two surfaces is carried by an optically transmissive member interposed between said body and said light source means.

8. A sensor as claimed in claim 7 and wherein said optically transmissive member is an optical fibre which carries said other of said two surfaces at one end thereof which is closely adjacent to said body.

9. A sensor as claimed in claim 3 and wherein said mask is light reflective and is carried by said body.

10. A sensor as claimed in claim 9 and wherein said mask is a highly reflective layer deposited onto a localized area of said body.

11. A sensor as claimed in claim 1 and wherein said means for determining the resonance frequency includes a photodetector arranged to receive reflected light which is amplitude modulated by the vibration of said body.

12. A sensor as claimed in claim 2 and wherein said one of said two surfaces is carried by said portion of said body.

13. A sensor as claimed in claim 12 and wherein said one of said two surfaces is constituted by an optically flat surface region of said body itself.

14. A sensor as claimed in claim 12 and wherein said one of said two surfaces is constituted by the outer surface of a thin metallic layer deposited upon said body.

15. A sensor as claimed in claim 2, and wherein the other of said two surfaces is carried by an optically transmissive member interposed between said body and said light source means.

16. A sensor as claimed in claim 15 and wherein said optically transmissive member is an optical fibre which carries said other of said two surfaces at one end thereof which is closely adjacent to said body.

* * * * *